United States Patent
Gyoten et al.

(10) Patent No.: US 6,881,510 B1
(45) Date of Patent: Apr. 19, 2005

(54) METHOD FOR RESORTING CHARACTERISTICS OF POLYMER ELECTROLYTE FUEL CELL

(75) Inventors: Hisaaki Gyoten, Shijonawate (JP); Teruhisa Kanbara, Toyonaka (JP); Makoto Uchida, Hirakata (JP); Kazuhito Hatoh, Osaka (JP); Osamu Sakai, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 294 days.

(21) Appl. No.: 10/088,111

(22) PCT Filed: Sep. 14, 2000

(86) PCT No.: PCT/JP00/06334

§ 371 (c)(1),
(2), (4) Date: Mar. 15, 2002

(87) PCT Pub. No.: WO01/22517

PCT Pub. Date: Mar. 29, 2001

(30) Foreign Application Priority Data

Sep. 17, 1999 (JP) ............................................. 11-262971

(51) Int. Cl.$^7$ ........................... H01M 8/04; H01M 8/18; H01M 8/10
(52) U.S. Cl. .............................. 429/23; 429/17; 429/21; 429/30
(58) Field of Search .............................. 429/13, 17, 21, 429/30, 23

(56) References Cited

U.S. PATENT DOCUMENTS

| 3,436,271 A | 4/1969 | Cole et al. ..................... 429/13 |
| 3,544,380 A | 12/1970 | Dey ............................. 429/13 |
| 3,791,870 A | 2/1974 | Grune ....................... 136/86 E |
| 4,910,099 A | 3/1990 | Gottesfeld ..................... 429/13 |
| 5,599,614 A | 2/1997 | Bahar et al. ................. 442/171 |

FOREIGN PATENT DOCUMENTS

| DE | 1 916 296 | 10/1970 |
| EP | 0 334 474 | 9/1989 |
| EP | 0 862 233 A2 | 9/1998 |
| EP | 0 867 963 A2 | 9/1998 |
| EP | 911898 A1 | 4/1999 |
| EP | 0 961 334 A2 | 12/1999 |
| JP | 54-144934 | 11/1979 |
| JP | 60-77365 | 5/1985 |

(Continued)

OTHER PUBLICATIONS

"Pulsed–Potential Oxidation of Methanol", Peter S. Fedkiw, et al., Department of Chemical Engineering, North Carolina, pp. 2459–2485, XP–002069148, J. Electrochem. Soc : Electrochemical Science and Technology, Oct. 1988.

(Continued)

*Primary Examiner*—Patrick Ryan
*Assistant Examiner*—Thomas H. Parsons
(74) *Attorney, Agent, or Firm*—McDermott Will & Emery LLP

(57) ABSTRACT

The present invention restores the performance of a fuel cell by: operating the cell in a loaded current mode different from that of a normal operation for a predetermined time; supplying an oxidant gas and a fuel gas to an anode and a cathode respectively and outputting a current from a cell body with the polarity being inverted; supplying a pressurized gas to at least one of the cathode and anode in an amount not less than 1.5 times as much as that in the normal operation or supplying oxygen to the cathode; or injecting a cleaning solution into the cathode and anode through a gas flow path. Consequently, it is possible to effectively restore a degraded performance of a polymer electrolyte fuel cell caused by a long operation.

3 Claims, 2 Drawing Sheets

FOREIGN PATENT DOCUMENTS

| | | | |
|---|---|---|---|
| JP | 60-136169 | | 7/1985 |
| JP | 61-243663 | | 10/1986 |
| JP | 6-260197 | | 9/1994 |
| JP | 06-260197 | * | 9/1994 |
| JP | 7-68186 | | 3/1995 |
| JP | 11-345624 | | 12/1999 |
| JP | 2000-3718 | | 1/2000 |
| JP | 2000-003718 | * | 1/2000 |
| JP | 2000-260455 | | 9/2000 |
| SU | 493838 | | 11/1975 |
| WO | WO 94/10716 | | 5/1994 |
| WO | WO 99/34465 | | 7/1999 |

OTHER PUBLICATIONS

Peter S. Fedkiw, et al., "Pulsed–Potential Oxidation of Methanol." Database Inspec [Online], Institute of Electrical Engineers, Stevenage GB, Database Accession No. 3344669, Journal of the Electrochemical Society, Oct. 1998, USA, vol. 135, No. 10, pp. 2459–2465, ISSN: 0013–4651, XP–002270760.

"The Effect of Impurity Ions on the Performances of Polymer Electrolyte membranes for Fuel Cells" T. Okada, et al. Fifth Fuel Cell Symposium Proceedings, National Institute of Materials and Chemical Research. (May 14–15, 1998) pp. 116–121.

* cited by examiner

METHOD FOR RESORTING CHARACTERISTICS OF POLYMER ELECTROLYTE FUEL CELL

TECHNICAL FIELD

The present invention relates to a method for restoring the performance of fuel cells useful as commercial cogeneration systems and power generating devices for mobile units, specifically, polymer electrolyte fuel cells using a polymer electrolyte.

BACKGROUND ART

Fuel cells cause a fuel gas such as hydrogen and an oxidant gas such as air to electrochemically react at a gas diffusion electrode, thereby concurrently supplying electricity and heat. Such fuel cells are classified into several types according to the kind of the electrolyte used therefor. The polymer electrolyte used herein generally comprises a skeleton of —$CF_2$— as its main chain and a sulfonic acid is attached to the terminal of its side chain.

A polymer electrolyte fuel cell is fabricated in the following manner. First, a paste for catalyst layer, prepared by mixing a dispersion of the above-described polymer electrolyte with a carbon powder carrying a platinum-based metal catalyst, is applied onto both surfaces of a membrane of this polymer electrolyte, and the whole was dried to form a catalyst layer, which will constitute electrodes (a cathode as an air electrode and an anode as a fuel electrode). On the outer surface of the catalyst layer, a porous conductive substrate such as a carbon paper is disposed as a gas diffusion layer, which will constitute the electrodes, for diffusing air and a fuel gas. In other words, the catalyst layer and the gas diffusion layer constitute the electrodes. Alternatively, the paste for catalyst layer may be applied onto the carbon paper constituting the gas diffusion layer, and the polymer electrolyte membrane may be bonded to this. This yields an electrolyte membrane-electrode assembly (MEA) comprising the polymer electrolyte membrane, catalyst layer and gas diffusion layer.

Conductive separator plates for mechanically fixing the MEA and electrically connecting adjacent MEAs in series are disposed on the outer surfaces of the MEA. The MEA and the separator plates are laminated to obtain a unit cell. A gas flow path for supplying a reactant gas (oxidant gas or fuel gas) to the electrode and transferring water produced by the reaction of hydrogen and oxygen, residual gas and the like, is formed on the separator plate. A carbon material having electrical conductivity, gas tightness and corrosion resistance is often used for the separator plate. However, because of the excellent moldability and cost-effectiveness as well as ease of thinning the separator, separators using a metal material such as stainless steel are also being investigated. Further, a sealing member such as a gasket or a sealing agent is arranged on the peripheries of the gas flow path, the electrode and the like to prevent the reactant gases from directly mixing or from leaking outside.

When the above-described unit cell is used as a power generating device, it is common to laminate a plurality of the unit cells in order to increase the output voltage. To the gas flow paths disposed on the separator plate, the fuel gas such as hydrogen and the oxidant gas such as air are supplied from outside through manifolds, and these gases are supplied to the gas diffusion layers of the respective electrodes. Current generated by the reaction of these gases at the catalyst layers is collected at the electrodes and is taken outside through the separator plates.

Herein, since the above-described polymer electrolyte exhibits hydrogen ion conductivity when it contains water, the fuel gas to be supplied to the fuel cell is generally humidified. In addition, since the cell reaction produces water at the cathode, water is always present within the cell. As a result, there is the possibility that ionic impurities, inorganic impurities and organic impurities contained in a carbon material, sealing material, resin material and metal material, each of which is the component of the cell, are eluted if the cell is operated for a long period of time.

Moreover, since air to be applied to the fuel cell contains, for example, trace amounts of air pollutants such as nitrogen oxides or sulfur oxides, the fuel gas is occasionally contaminated with traces amount of metal contained in the hydrogen generating device.

Further, such impurities are accumulated in the polymer electrolyte membrane, the catalyst layer at the electrode and the like, leading to a reduction in the conductivity of the polymer electrolyte as well as the catalytic activity. This results in the problem that the cell performance is gradually degraded during a long operation of the fuel cell. Additionally, in the case where a metal is used for the separator plate, metal ions eluted from the separator plate cause a further damage to the polymer electrolyte membrane and the catalyst layer.

Therefore, it is an object of the present invention to provide a method for effectively restoring the performance of a polymer electrolyte fuel cell In the case where the cell performance has been degraded owing to an accumulation of the impurities as described above.

DISCLOSURE OF INVENTION

In order to achieve the foregoing object, the present invention provides a method for restoring performance of a polymer electrolyte fuel cell comprising: a cell body composed of laminated unit cells, each of the unit cells comprising a cathode and an anode interposing a hydrogen ion-conductive polymer electrolyte membrane therebetween and a pair of conductive separator plates having gas flow paths for supplying and discharging a fuel gas and an oxidant gas to and from the cathode and the anode respectively and sandwiching the cathode and the anode therebetween; means for supplying and discharging the oxidant gas and the fuel gas to and from the cell body; and means for controlling output of a current generated in the cell body.

Mainly, the method for restoring the cell performance in accordance with the present invention has four embodiments.

The first embodiment is the method for restoring performance of the polymer electrolyte fuel cell that involves operating the polymer electrolyte fuel cell in a loaded current mode different from that of a normal operation for a predetermined time, thereby restoring the performance of the fuel cell.

In this case, it is effective that the loaded current mode different from that of the normal operation is either an operation mode at a current of not less than 1.5 times as high as that in the normal operation or an operation mode at a current giving an output voltage per unit cell of not more than 0.2 V.

The second embodiment is the method for restoring performance of the polymer electrolyte fuel cell that involves: supplying an oxidant gas and a fuel gas to the anode and the cathode respectively, while supplying the fuel gas to the anode and the oxidant gas to the cathode in the normal operation; and outputting a current from the cell body with the polarity being inverted, thereby restoring the performance of the fuel cell.

The third embodiment is the method for restoring performance of the polymer electrolyte fuel cell that involves supplying a pressurized gas to at least one of the cathode and the anode in an amount not less than 1.5 times as much as that in the normal operation or supplying oxygen to the cathode, thereby restoring the performance of the fuel cell.

The fourth embodiment is the method for restoring the performance of the polymer electrolyte fuel cell that involves injecting a cleaning solution into the cathode and the anode through the gas flow path, thereby restoring the performance of the fuel cell.

In this case, it is effective that the cleaning solution is an acidic solution having a pH of less than 7.

It should be noted that the separator plate in the polymer electrolyte fuel cell of the present invention may also contain a metal material.

According to the method for restoring the cell performance of the present invention, it is possible to discharge impurities accumulated in the cell body, such as contaminant ions, to the outside of the cell body.

BEST MODE FOR CARRYING OUT THE INVENTION

Figure 1:
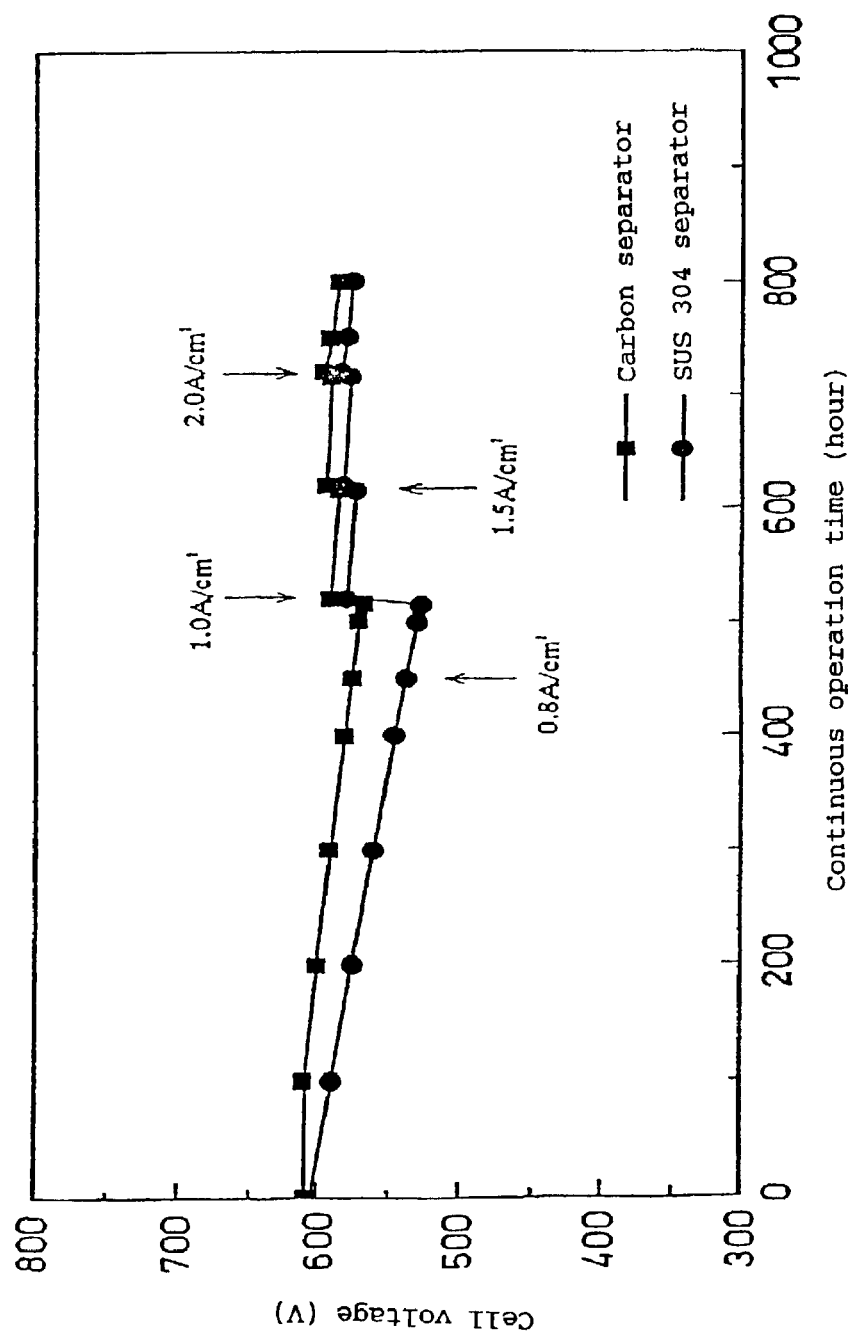
FIG. 1 is a graph showing how the performance of the fuel cell in Example 1 of the present invention is restored.

The ionic conductivity of the electrolyte used in the above-described polymer electrolyte fuel cell is achieved by hydrogen ions of the sulfonic group attached to the terminal of the polymer's side chain. However, in the case where metal ions such as iron ions or sodium ions are present as contaminant ions (impurities), these impurities replace hydrogen ions to reduce the ionic conductivity of the electrolyte membrane. Further, since the metal ions entered into the electrolyte have different hydrated states from those of hydrogen ions, the water content of the electrolyte is decreased, which also reduces the ionic conductivity of the electrolyte membrane.

Such reduction in the ionic conductivity and decrease in the water content not only increase the direct current resistance of the cell, but also decrease the reaction area of the catalyst layer in the electrode, thus causing a further degradation of the cell performance. Moreover, the above-described metal ions adhere to the surface of the catalyst, or seal the catalyst by forming oxides to degrade the cell performance. Furthermore, sulfur oxides, which are anionic impurities, poison the catalyst to degrade the cell performance, and nitrogen oxide ions and carboxylic acid ions, which are acidic substances, corrode and denaturalize the components of the fuel cell.

In the normal operation, these contaminant ions are present in high concentrations at a specific site in the cell. For example, the above-described metal ions are distributed in high concentration at the interface between the electrolyte membrane and the electrode or in the polymer electrolyte which has been kneaded into the electrode. The acidic substances derived from the anionic impurities are gradually accumulated on the surfaces of the electrode base material serving as the gas diffusion layer, and the separator plate. Since these metal ions, cationic impurities, and anionic impurities are not discharged to the outside of the cell in the normal operation, they become a cause of gradual degradation of the cell performance.

The ionic impurities present in the cell are classified into those that are easy to move and those that are not, according to their ionic species. However, they both move along with a current passing through the cell, at a constant rate. Taking advantage of this fact, if the cell is operated at a current density of not less than 1.5 times as high as that in the normal operation (e.g. rated operation), the accumulated contaminant ions change the distributions thereof and are expelled from the electrolyte to be mixed with water produced by the electrode reaction, whereby it is possible to discharge them to the outside of the cell.

It is also possible to discharge the contaminant ions by switching the gases to be supplied to the fuel electrode and the air electrode and reversing the direction of the current and thereby transporting the ions opposite to the direction in which they entered.

Further, it is possible to promote the transport and discharge of the contaminant ions by pressurizing the fuel gas and the oxidant gas, which are the reactant gases, or by using oxygen as the oxidant gas.

Further, since the contaminant ions contained in the electrolyte are discharged to the outside by being replaced by hydrogen ions, it is possible to discharge them to the outside by washing the electrolyte, electrode and the like, with an acidic solution.

In the following, the present invention will be concretely described by way of examples; however, the present invention is not limited thereto.

EXAMPLES 1 AND 2

An acetylene black carbon powder carrying 25 wt% of platinum particles having a mean particle size of approximately 30 Å was used as a catalyst for electrode. A dispersion in which a powder of this catalyst was dispersed in isopropanol was mixed with a dispersion in which a powder of perfluorocarbon sulfonic acid was dispersed in ethyl alcohol, thereby obtaining a paste for catalyst layer.

Meanwhile, a carbon paper having a thickness of 300 $\mu$m was immersed in an aqueous dispersion of polytetrafluoroethylene (PTFE), and dried to obtain a water-repellent gas diffusion layer (porous electrode base material). The above-described paste for catalyst layer was applied onto one surface of this gas diffusion layer, which was then dried to obtain an electrode comprising a catalyst layer and the gas diffusion layer.

Next, a polymer electrolyte membrane was sandwiched by a pair of the above electrodes, with the catalyst layers facing inwardly, and the whole was hot-pressed at a temperature of 110° C. for 30 seconds, thereby fabricating an MEA. Herein, a polymer electrolyte membrane made of perfluorocarbon sulfonic acid (Nafion manufactured by Du Pont), having a thickness of 50 $\mu$m, was used as the polymer electrolyte membrane.

It should be noted that as the conductive porous base material constituting the gas diffusion layer, a carbon cloth obtained by weaving a carbon fiber, which is a flexible material, and a carbon felt obtained by molding a mixture of a carbon fiber, carbon powder and organic binder may also be used, in addition to the above-described carbon paper.

Next, a carbon plate was obtained by cold press-molding a carbon powder material, and this carbon plate was impregnated with a phenolic resin and then cured by heating to improve the gas sealing property. A gas flow path was formed by cutting on this carbon plate to obtain a separator plate of the present invention. Disposed on the periphery of the gas flow path were manifold apertures for supplying and discharging gases and a manifold aperture for supplying and discharging a cooling water which was flowed for controlling the interior temperature of the fuel cell. Further, in addition to the above-described carbon separator, a metal separator plate was prepared, which had been obtained by forming the gas flow paths and the manifold apertures on a metal plate made of stainless steel (SUS 304).

A gasket made of silicone rubber as the gas sealing material was disposed on the periphery of the MEA having an electrode surface area of 25 cm$^2$, and the MEA was sandwiched either by two sheets of the carbon separator plate or by two sheets of the separator plate made of SUS 304, and the whole was clamped from both ends, while being compressed at a pressure of 20 kgf/cm$^2$, thereby obtaining two types of unit cells: unit cells A and B.

In practice, a plurality of unit cells are generally laminated while separator plates having a cooling water flow path are interposed therebetween when used as a fuel cell. However, supposing that the above-described contaminant ions are hardly transported from one unit cell to another, the evaluation was made using a unit cell as a fuel cell in the present examples.

A gas supply device for supplying a humidified reactant gas to the cathode and anode, an electricity output device for setting and controlling the output of a loaded current from the unit cell and a heat adjustment device for adjusting the cell temperature were attached to each of the unit cells fabricated as above, thereby obtaining polymer electrolyte fuel cells A and B of the present examples. This heat adjustment device was configured such that the cooling water was flowed along the direction parallel to the plane of the unit cell. It should be noted that in a fuel cell, this heat adjustment device can also be used in order to effectively utilize an exhaust heat.

Each of the fuel cells A and B fabricated as above was operated with the following operational condition defined as the normal mode, and the cell, of which performance had been degraded from the initial performance as a result of the operation, was used to evaluate the effectiveness of the method for restoring the cell performance in accordance with the present invention.

First, the output current density was set at 0.6 A/cm$^2$. Next, the gas utilization rate, that is, an index representing the ratio of the gas actually participating in the electrode reaction to the supplied fuel gas and oxidant gas, was set at 70% at the anode side and 30% at the cathode side. Also, the cooling water was adjusted such that the cell temperature became 75° C. Then, pure hydrogen and air were used as the reactant gases to be supplied, and the pressure of the air supplied from the inlet of the gas flow path was set at 0.2 kgf/cm$^2$, the pressure of hydrogen was set at 0.05 kgf/cm$^2$, and the outlet of the gas flow path was opened to the atmosphere.

As a result of operating the fuel cells under this condition, the performance of each of the fuel cells A and B started to be degraded after a continuous operation of 500 hours. At this time, the current density was increased to 0.8 A/cm$^2$, and each cell was operated under this condition for 20 hours. Thereafter, each of the fuel cells A and B was operated with the current density being decreased to 0.6 A/cm$^2$ again; however, no significant improvement was observed in the performance. Therefore, the current density was increased to 1.0 A/cm$^2$ once again, and each cell was operated under this condition for 20 hours to attempt to remove and discharge the contaminant ions and thereby restoring the cell performance. Further, the current density was increased to 1.5 A/cm$^2$ and 2.0 A/cm$^2$ to similarly attempt to remove and discharge the contaminant ions. The result of these continuous cell tests is shown in FIG. 1. FIG. 1 is a graph showing how the cell performance was restored based on the relationship between the continuous operation hours and the cell voltage of each of the fuel cells A and B in Examples 1 and 2.

Referring to FIG. 1, in the case where the current density was increased to 1.0 A/cm$^2$, the cell voltage of the fuel cell A using the carbon separator plate was restored, from 570 mV to 590 mV, and the cell voltage of the fuel cell B using the separator plate made of SUS 304 was restored, from 530 mV to 580 mV. Similarly, in the case where the current density was increased to 1.5 A/cm$^2$ and 2.0 A/cm$^2$, the cell voltage of each cell was improved.

By an analysis of the water discharged from each fuel cell when the output current was increased as described above, iron ions were detected in the fuel cell B using the separator plate made of SUS 304, and a phenol component was detected in the fuel cell A using the carbon separator plate. This result demonstrated that the contaminant ions accumulated in the cell due to the long operation could be removed and discharged by the method of the present invention and thereby restoring the cell performance.

EXAMPLES 3 AND 4

In the above Examples 1 and 2, it was confirmed that the object of the present invention could be achieved by changing the current density and thereby restoring the degraded performance of the fuel cell caused by the continuous operation.

In this example, a method for restoring the cell performance was conducted by increasing the loaded current to maintain the output voltage of each of fuel cells A and B, fabricated in the same manner as that used in Examples 1 and 2, at not more than 0.2 V for a predetermined time, and, thereafter, returning the operation to the normal mode.

As a result, it was also possible to restore the output voltage as described above by using this method.

EXAMPLES 5 AND 6

In the present examples, a method for restoring the dell performance was conducted by continuously operating each of fuel cells A and B, fabricated in the same manner as that used in Examples 1 and 2, for 500 hours, and reversing the direction of the output current after the cell voltage dropped.

More specifically, air was supplied to the anode side, to which hydrogen was supplied in the normal operation (output current=0.6 A/cm$^2$), and hydrogen was supplied to the cathode side, to which air was supplied in the normal operation, and each cell was operated at 0.6 A/cm$^2$ for 20 hours in this condition, with the direction of the output current being reversed. Thereafter, the operation was returned to the normal mode. By conducting such steps, the voltage of the fuel cell A using the carbon separator plate was restored, from 570 mV to 585 mV, and the voltage of the fuel cell B using the separator plate made of SUS 304 was restored, from 530 mV to 565 mV.

As described above, by conducting the method that involved changing the magnitude and direction of the loaded current and the method that involved switching the types of the reactant gases supplied to the gas flow paths and reversing the direction of the output current, it was possible to discharge the contaminants accumulated in the cell by mixing them into an exhaust gas and exhaust water, thereby restoring the cell performance.

It was also possible to restore the cell performance by conducting the method that involved changing the direction in which the reactant gases were supplied, that is, the method that involved supplying each of the reactant gases from the place that served as its discharge port in the normal operation. Moreover, this effect of restoring the cell performance could be enhanced by conducting the method that involved supplying pure oxygen in place of air and the method that involved supplying a pressurized reactant gas.

EXAMPLES 7 AND 8

Next, by using fuel cells A and B fabricated in the same manner as that used in Examples 1 and 2, a method of restoring the cell performance was conducted by forcibly washing the fuel cells to reduce the concentration of contaminant ions present in the fuel cell of which performance had been degraded.

First, as in Example 1, the fuel cells A and B were continuously operated for 500 hours in the normal operation mode, and the operation was suspended when the cell voltage dropped from the initial voltage. Next, each of these fuel cells A and B was boiled in pure water for one hour to circulate the boiling pure water inside the cell through the gas flow path for supplying the reactant gas.

After this step, each cell was operated in the normal operation mode once again; consequently, the cell voltage of the fuel cell A using the carbon separator plate was restored, from 570 mV to 580 mV, and the cell voltage of the fuel cell B using the separator plate made of SUS 304 was restored, from 530 mV to 555 mV.

EXAMPLES 9 AND 10

While boiling water was used for washing the fuel cells in Examples 7 and 8, diluted sulfuric acids having the respective pHs of 2 and 1 were used in the present examples. As in Example 1, each of fuel cells A and B. fabricated in the same manner as that used in Examples 1 and 2, was operated in the normal operation mode, and the operation was suspended. Then, each diluted sulfuric acid was supplied, through a tube, to each of these fuel cells A and B from reactant gas supply ports (inlets of the gas flow path) provided at the cathode and anode sides, and then discharged from the corresponding discharge ports. After washing each cell with the diluted sulfuric acid for two hours, pure water was supplied to sufficiently wash the cell until the pH of the cleaning water discharged from the discharge port became 5 or more.

After this step, each cell was operated in the normal operation mode once again; consequently, the cell voltage of the fuel cell A using the carbon separator plate was restored, from 580 mV to 588 mV, and the cell voltage of the fuel cell B using the separator plate made of SUS 304 was restored, from 555 mV to 572 mV.

Figure 2:
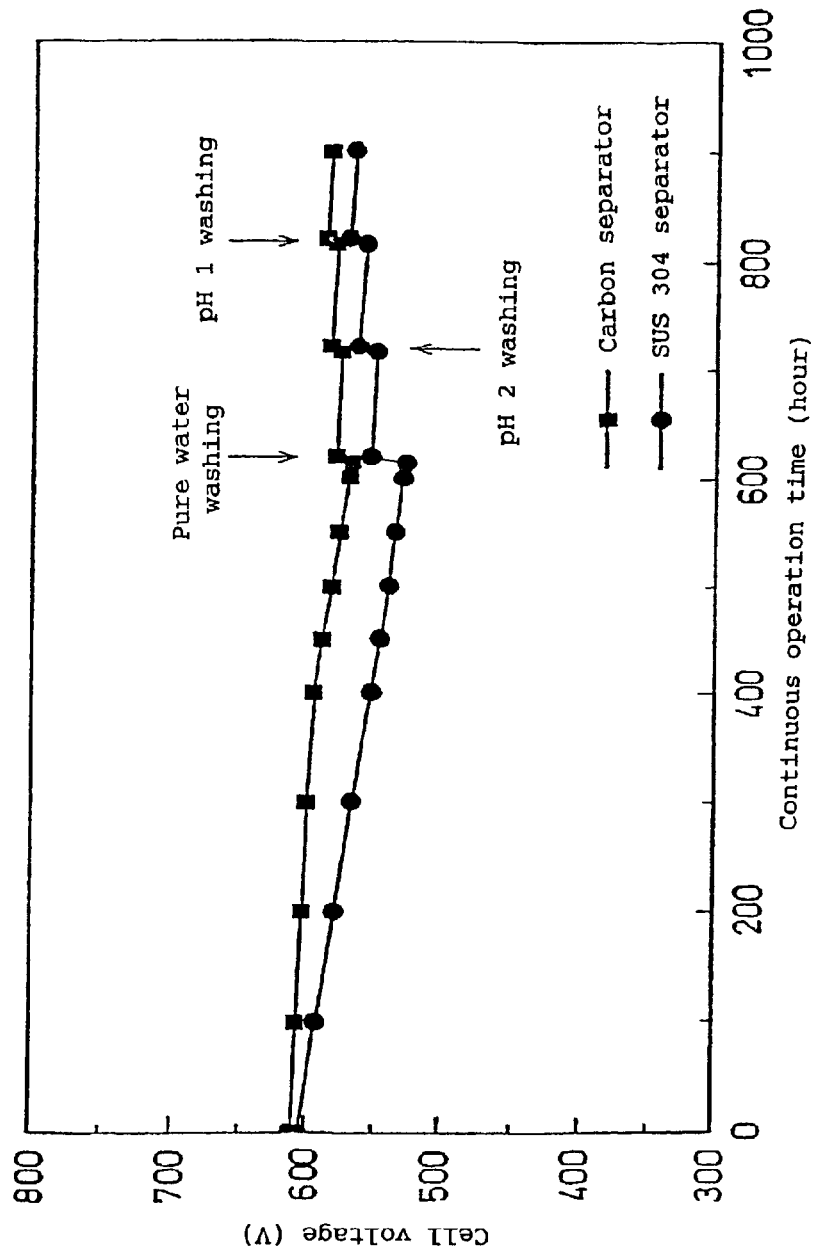
FIG. 2 is a graph showing how the performance of the fuel cell in Example 3 of the present invention is restored.

In the above-described examples, weakly acidic diluted sulfuric acids were used for the cleaning solution; on the other hand, in the case where weakly alkaline cleaning solutions, that is, cleaning solutions having a pH of approximately 9 were used, no significant restoration was observed, although it was confirmed that a little effect was achieved by the washing. The result is shown in FIG. 2.

As such, it was possible to restore the cell performance by washing the inside of the cell with the cleaning solution. It was also confirmed that the higher the temperature at which the washing was conducted, the higher the effect of restoring became.

It was also possible to enhance the restoration of the cell voltage by concurrently using the method for restoring the performance conducted in Example 1 that involved operating the cell at a high current density and the method for restoring the performance that involved washing the cell with the weakly acidic cleaning solution. Further, it was confirmed that a similar effect could be achieved by using a diluted acetic acid or ammonium sulfate for the weakly acidic cleaning solution.

Hereinbelow, the effect of the present invention demonstrated in Examples 1 to 10 above is summarized in consideration of the difference in the material forming the separator plate, which was the component of the cell body. Although the performance of the fuel cell B using the metal separator was degraded owing to the metal ions eluted from the separator plate during the long operation, it could be restored by removing the metal ions accumulated in the cell by the operation at a high current and/or the washing with the weakly acidic cleaning solution.

On the other hand, in the case of the fuel cell A using the carbon separator plate, the metal ions or various cations were not eluted as much as those in the case of the fuel cell using the metal separator plate; however, trace amounts of iron and calcium were found to be contained in the separator plate through an ashing analysis. Accordingly, although the performance of the cell was not degraded as significantly as that of the fuel cell using the metal separator plate, it was degraded to some extent during the long operation, owing to the contained metal ions. In addition, it was considered that the cell performance decreased by approximately 30 mV after the continuous test of 500 hours because of organic materials eluted from the resin, which had been added for improving the gas tightness of the carbon separator plate, as well as trace amounts of sulfur compounds and nitrogen oxides contained in air. The method for restoring the cell performance in accordance with the present invention was effective even for the fuel cell A using such carbon separator plate.

The polymer electrolyte fuel cell to which the method for restoring the cell performance of the present invention is applicable is required to have in its electricity output system, means for adjusting a loaded current and an output voltage, or alternatively, it is required to have in its gas supply system, means capable of supplying a cleaning solution to a gas flow path to directly wash the inside of the cell. Furthermore, the above fuel cell is also required to allow the control of a loaded current and/or an output voltage, or the washing of the inside thereof, after the elapse of a predetermined period, or after a predetermined period of operation, or after the cell performance has been degraded.

As the devices to be installed in such polymer electrolyte fuel cell, there are, for example, a fuel reforming device, controlling device, charger and the like, in addition to the above-mentioned cell body, gas supply device, heat adjustment device and electricity output device. Such fuel cell can be applied to, for example, electric vehicles equipped with a fuel cell, cogeneration systems, portable power source systems and the like.

INDUSTRIAL APPLICABILITY

According to the present invention, it is possible to effectively restore a degraded performance of a polymer electrolyte fuel cell caused by a long operation, thereby providing a highly durable polymer electrolyte fuel cell.

What is claimed:

1. A method for restoring performance of a polymer electrolyte fuel cell comprising: a cell body composed of laminated unit cells, each of said unit cells comprising a cathode and an anode interposing a hydrogen ion-conductive polymer electrolyte membrane therebetween and a pair of conductive separator plates having gas flow paths for supplying and discharging an oxidant gas and a fuel gas to and from said cathode and said anode respectively and sandwiching said cathode and said anode therebetween; means for supplying and discharging said oxidant gas and said fuel gas to and from said cell body; and means for controlling output of a current generated in said cell body, said method comprising the step of operating said polymer electrolyte fuel cell for a predetermined time either in an operation mode at a current of not less than 1.5 times as high as that in a normal operation, or in an operation mode at a current giving an output voltage per unit cell of not more than 0.2 V, thereby restoring the performance of said fuel cell.

2. A method for restoring performance of a polymer electrolyte fuel cell comprising: a cell body composed of laminated unit cells, each of said unit cells comprising a cathode and an anode interposing a hydrogen ion-conductive polymer electrolyte membrane therebetween and a pair of conductive separator plates having gas flow paths for supplying and discharging an oxidant gas and a fuel gas to and from said cathode and said anode respectively and sandwiching said cathode and said anode therebetween; means for supplying and discharging said oxidant gas and said fuel gas to and from said cell body; and means for controlling output of a current generated in said cell body, said method comprising the step of supplying a pressurized gas to at least one of said cathode and said anode in an amount not less than 1.5 times as much as that in the normal operation, thereby restoring the performance of said fuel cell.

3. A method for restoring of a polymer electrolyte fuel cell comprising: a cell body composed of laminated unit cells, each of said unit cells comprising a cathode and an anode interposing a hydrogen ion-conductive polymer electrolyte membrane therebetween and a pair of conductive separator plates having gas flow paths for supplying and discharging an oxidant gas and a fuel gas to and from said cathode and said anode respectively and sandwiching said cathode and said anode therebetween; means for supplying and discharging said oxidant gas and said fuel gas to and from said cell body; and means for controlling output of a current generated in said cell body, said method comprising the step of injecting an acidic solution having a pH of less than 7 into said cathode and said anode through said gas flow path, thereby restoring the performance of said fuel cell.

* * * * *